United States Patent [19]
Kondo

[11] Patent Number: 5,600,842
[45] Date of Patent: Feb. 4, 1997

[54] MICROPROGRAM CONTROLLER FOR CONTROLLING READOUT OF A MICROPROGRAM STORED IN MULTIPLE STORAGE AREAS

[75] Inventor: Hidetoshi Kondo, Yamanashi, Japan

[73] Assignee: NEC Corporation, Tokyo, Japan

[21] Appl. No.: 317,536

[22] Filed: Oct. 4, 1994

[30] Foreign Application Priority Data

Oct. 5, 1993 [JP] Japan ................................. 5-248934

[51] Int. Cl.⁶ .......................................... G06F 9/22
[52] U.S. Cl. .................................................. 395/582
[58] Field of Search ................................ 395/375, 775, 395/800, 846; 371/40.1

[56] References Cited

U.S. PATENT DOCUMENTS

| | | | |
|---|---|---|---|
| 3,839,705 | 10/1974 | Davis et al. | 395/375 |
| 4,270,184 | 5/1981 | Shimokawa | 395/775 |
| 4,408,276 | 10/1983 | Nishibe | 395/550 |
| 4,438,492 | 3/1984 | Harmon, Jr. et al. | 395/375 |
| 4,646,230 | 2/1987 | Eguchi | 395/846 |
| 4,773,002 | 9/1988 | Iwasaki et al. | 395/375 |
| 4,920,482 | 4/1990 | Hasebe et al. | 395/375 |
| 5,144,628 | 9/1992 | Sekiguchi | 371/40.1 |
| 5,247,624 | 9/1993 | Koumoto et al. | 395/375 |
| 5,428,809 | 6/1995 | Coffin et al. | 395/800 |

*Primary Examiner*—Gopal C. Ray
*Attorney, Agent, or Firm*—Foley & Lardner

[57] ABSTRACT

Connecting an address register and a read register to each of a main control storage and an external control storage to transfer an output from the read register of the external control storage to the read register of the main control storage, and providing a branching determination circuit for making branching determination of conditional branching instructions from the main control storage and the external control storage and a branching determination synchronization circuit for, when the conditional branching instruction comes from the external control storage, executing the conditional branching instruction and the synchronization between the main control storage and the external control storage, to execute the microprogram and conditional branching instructions by the output of the read register of the main control storage.

17 Claims, 6 Drawing Sheets

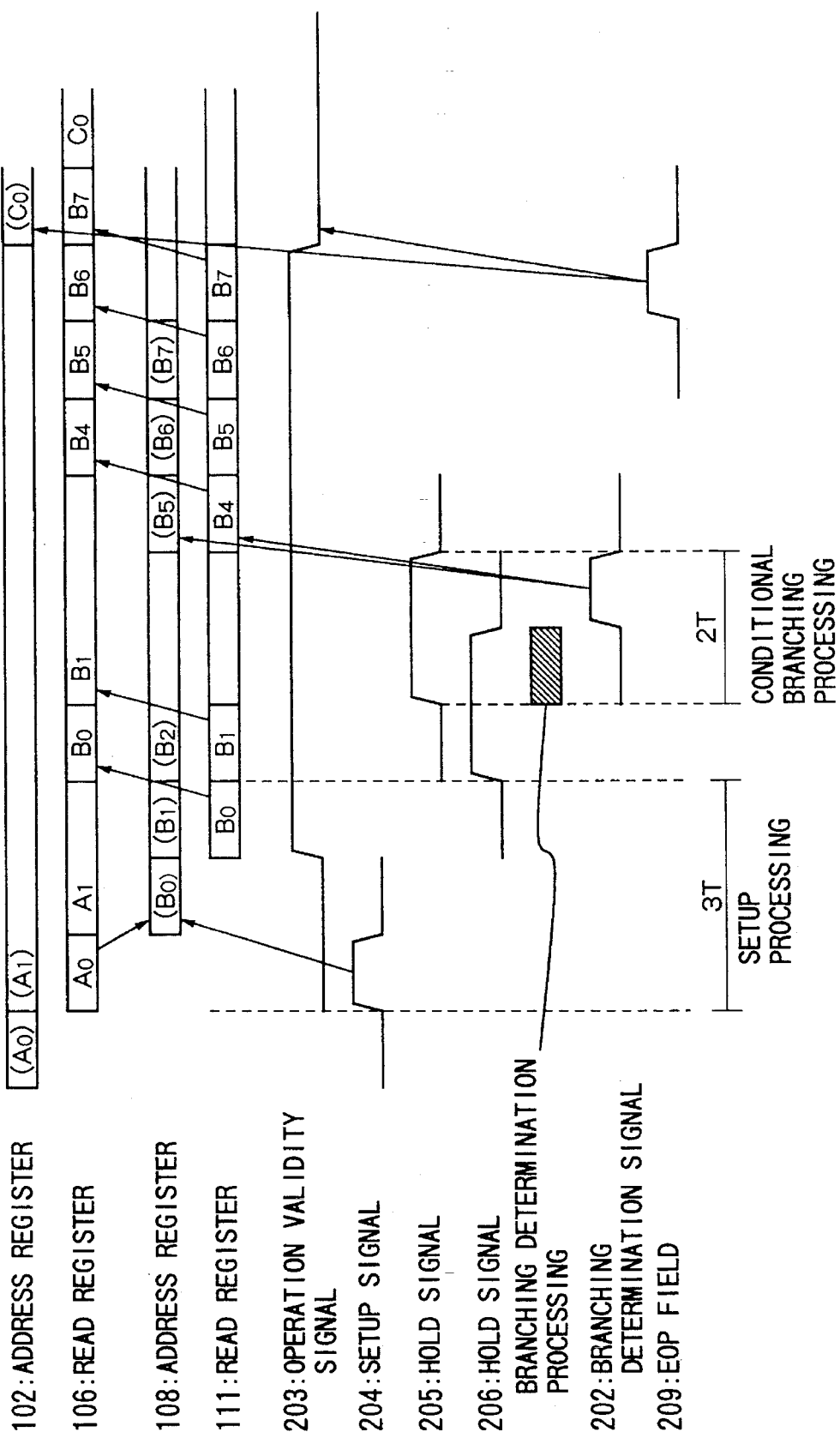

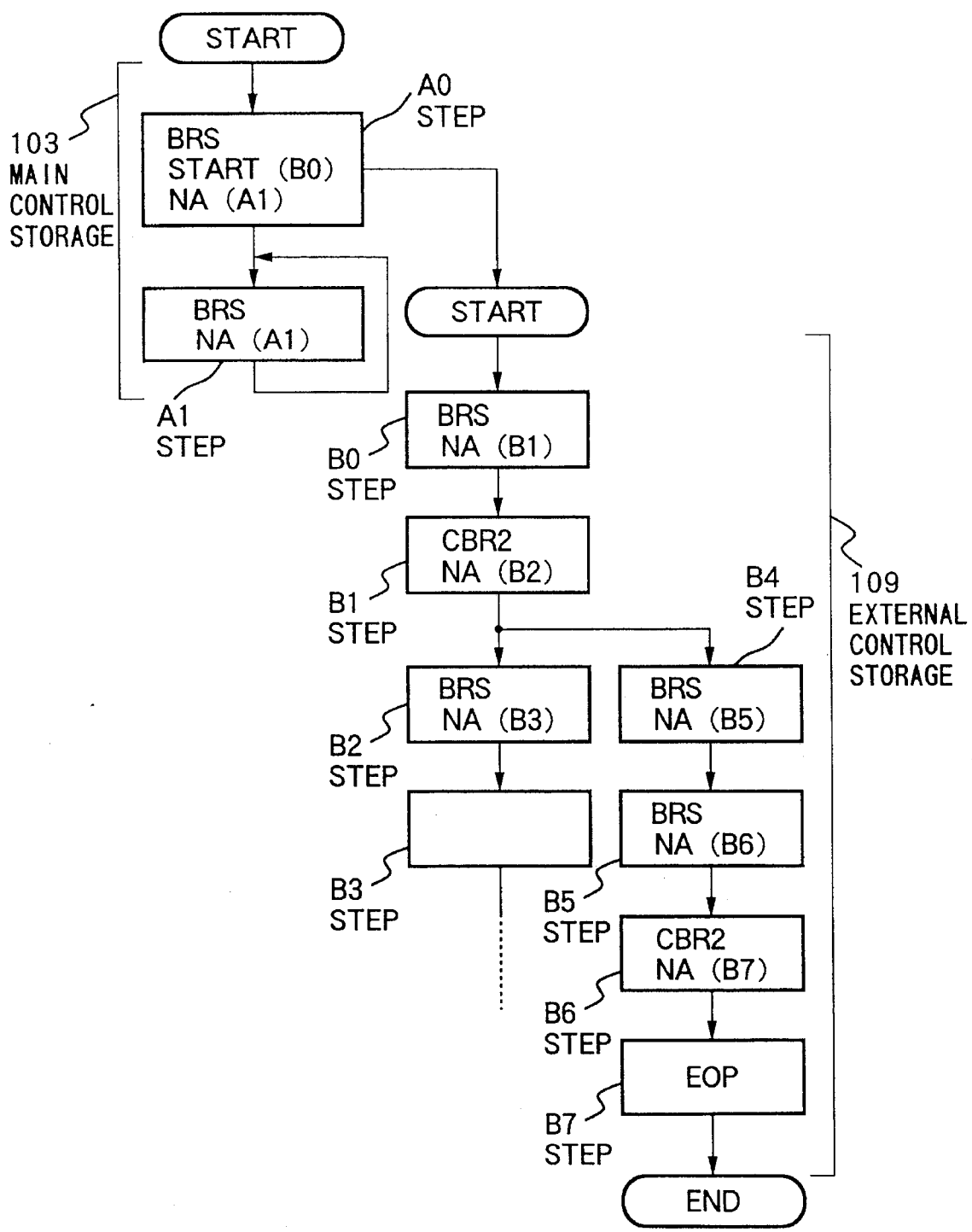

FIG.4

TABLE OF MICROPROGRAM WORD FIELDS

| ISQ | EOP | FUT | ......  ...... | NA |

FIG.5

"ISQ" FIELD

| COMMAND | BIT PATTERN | OPERATION OUTLINE |
|---|---|---|
| BRS | 000 | UNCONDITIONAL BRANCHING INSTRUCTION COMMAND. USING THE VALUE OF THE NA FIELD OF MICROPROGRAM WORD READ FROM THE CONTROL STORAGE UNIT AS AN ADDRESS OF A NEXT MICROPROGRAM WORD TO BE EXECUTED. |
| CBR2 | 001 | BI-DIRECTIONAL CONDITION BRANCHING INSTRUCTION COMMAND. USING, AS AN ADDRESS OF A MICROPROGRAM WORD TO BE EXECUTED NEXT, THE VALUE OF THE NA FIELD OF A MICROPROGRAM WORD SELECTED BY A BRANCHING DETERMINATION SIGNAL MADE UP OF ONE LOWER-ORDER BIT OF THE ADDRESS REGISTER AND ONE BIT OF THE CONDITION TEST SIGNAL. |
| CBR4 | 010 | FOUR-DIRECTIONAL CONDITION BRANCHING INSTRUCTION COMMAND. USING, AS AN ADDRESS OF A MICROPROGRAM WORD TO BE EXECUTED NEXT, THE VALUE OF THE NA FIELD OF A MICROPROGRAM WORD SELECTED BY THE BRANCHING DETERMINATION SIGNAL MADE UP OF TWO BITS OF THE CONDITION TEST SIGNAL. |
| ⋮ | ⋮ | ⋮ |

FIG.6

"FUT" FIELD

| COMMAND | BIT PATTERN | OPERATION OUTLINE |
|---|---|---|
| START | 1xxxxxxxxxxxx | DURING THE EXECUTION OF THE MICROPROGRAM SEQUENCE CONTROL, THE MAIN CONTROL STORAGE UNIT OR THE EXTERNAL CONTROL STORAGE UNIT IS STARTED. THE EXTERNAL CONTROL STORAGE UNIT SETUP CIRCUIT IS CONTROLLED BY USING THE FUT (1:12) FIELD AS A SETUP ADDRESS. THE MOST SIGNIFICANT BIT "1" IS FOR THE DISCRIMINATION BETWEEN THE START COMMAND AND OTHER COMMANDS. |
| ⋮ | 0xxxxxxxxxxxx | OTHER CONTROL |

FIG.7

TABLE OF CONDITIONAL BRANCHING
DETERMINATION CONTROL

| OPERATION VALIDITY SIGNAL 203 | "ISQ" FIELD 208, 211 | BRANCHING CONDITION DETERMINATION SIGNAL 201, 202 |
|---|---|---|
| 0 | BRS | ADDRESS REGISTER 102 (10:2) |
| 0 | CBR2 | ADDRESS REGISTER 102 (10) -BRANCHING TEST (1) |
| 0 | CBR4 | BRANCHING TEST (0:2) |
| 1 | BRS | ADDRESS REGISTER 108 (10:2) |
| 1 | CBR2 | ADDRESS REGISTER 108 (10) -BRANCHING TEST (1) |
| 1 | CBR4 | BRANCHING TEST (0:2) |

MICROPROGRAM CONTROLLER FOR CONTROLLING READOUT OF A MICROPROGRAM STORED IN MULTIPLE STORAGE AREAS

BACKGROUND OF THE INVENTION

1. Field of the Invention

The present invention relates generally to microprogram controllers, and more particularly, to microprogram controllers in information processors which control readout of a microprogram stored in a plurality of storages.

2. Description of the Related Art

In recent years, conventional microprogram-controlled information processors tend to use larger-sized microprograms in order to increase their performance. On the other hand, improvement in performance of an information processor requires reduction of the number of necessary machine cycles and manufacturing costs etc. It is therefore undesirable to highly increase a capacity of an internal control storage for storing a microprogram of an information processor.

To avoid a further increase in a capacity of a storage, overlay microprogram systems have been proposed. In an overlay microprogram control system, a microprogram, which is too large in size to be held in an internal control storage provided in an information processor, is stored in an external storage with a large capacity. The microprogram is divided into a plurality of blocks, loaded on a block basis from the external storage into the internal control storage in the information processor, and then executed by the control storage in the information processor after the loading.

However, with an extremely long microprogram to be loaded into a control storage in an information processor from an external control storage, the above-described conventional overlay microprogram control system requires repetitions of loading of the microprogram because it is divided into blocks. As a result, not only a loading time but also a time for controlling loading are increased, making an overall processing time longer and thereby degrading the performance of the information processor.

SUMMARY OF THE INVENTION

An object of the present invention is to overcome the foregoing shortcomings by providing a microprogram controller capable of storing a large-sized microprogram, which is too long to be held in a single control storage, in a plurality of control storages, while minimizing an increase of a processing time, a drawback of a conventional overlay microprogram system, to achieve high-speed control of the microprogram.

Another object of the present invention is to provide a microprogram controller capable of performing high-speed processing of a microprogram, which is too large in size to be held in a single control storage, by executing a conditional branching instruction and controlling synchronization between a main control storage and an external control storage when the conditional branching instruction comes from the external control storage.

According to one aspect of the invention, a microprogram controller includes:

first storing means for storing a microprogram;

second storing means for storing said microprogram;

first address holding means for holding an address for reading said microprogram word from said first storing means;

second address holding means for holding an address for reading said microprogram word from said second storing means;

first microprogram word holding means for holding a microprogram word to be read for execution from said first storing means or a microprogram word to be read for execution from said second storing means; and controlling means for selectively providing the microprogram word read from said first storing means or said second storing means to said first microprogram word holding means.

In the preferred construction, the controlling means selects a microprogram word read from said first storing means or said second storing means as a next microprogram word to be provided to said first microprogram word holding means, based on a command included in said microprogram word provided to said first microprogram word holding means.

Also, a microprogram controller may further comprise selecting means for selecting a microprogram word read from said first storing means or said second storing means and inputting the same to said first microprogram word holding means, and wherein said controlling means selects said microprogram word to be provided to said first microprogram word holding means by switching said selecting means based on a command included in said microprogram word provided to said first microprogram word holding means.

Also, a microprogram controller may further comprise second microprogram word holding means for temporarily storing said microprogram word read from said second storing means, said second microprogram word holding means being connected to said first microprogram word holding means.

According to another aspect of the invention, a microprogram controller includes:

first storing means for storing a microprogram;

second storing means for storing said microprogram;

first address holding means for holding an address for reading said microprogram word from said first storing means;

second address holding means for holding an address for reading said microprogram word from said second storing means;

first microprogram word holding means for holding a microprogram word to be read for execution from said first storing means or a microprogram word to be read for execution from said second storing means;

controlling means for selectively setting the microprogram words read from said first storing means or said second storing means to said first microprogram word holding means; and branching determining means, when said microprogram word held in said first microprogram word holding means is a conditional branching instruction, for executing branching determination processing of said conditional branching instruction.

In the above-mentioned construction, the microprogram controller may further comprise selecting means for selecting a microprogram word read from said first storing means or said second storing means and inputting the same to said first microprogram word holding means, and wherein said controlling means selects said microprogram word to be provided to said first microprogram word holding means by switching said selecting means based on a command included in said microprogram word provided to said first microprogram word holding means.

In the above-mentioned construction, the microprogram controller may further comprise second microprogram word holding means connected to said first microprogram word holding means for temporarily storing said microprogram word read from said second storing means; and branching determination synchronizing means, when a microprogram word held in said second microprogram word holding means is a conditional branching instruction, for holding said microprogram word from being read from said first storing means and said second storing means in synchronization with the conditional branching processing performed by said branching determining means according to said conditional branching instruction.

Also, in the preferred construction, said first storing means and said second storing means each include a plurality of banks, said addresses stored in said first and second address holding means each include a bank address for simultaneously accessing all the banks of said first storing means and said second storing means and a selection address for selecting one of said accessed banks, and said branching determining means, when said microprogram word held in said first microprogram word holding means is a conditional branching instruction, outputs a branching determination signal for selecting a next microprogram word to be read from said first storing means and said second storing means from one of said accessed banks, according to said conditional branching instruction.

According to a further aspect of the invention, a microprogram controller includes:

first storing means for storing a microprogram;

second storing means for storing said microprogram;

first address holding means for holding an address for reading said microprogram word from said first storing means;

second address holding means for holding an address for reading said microprogram word from said second storing means;

first microprogram word holding means for holding a microprogram word to be read for execution from said first storing means or a microprogram word to be read for execution from said second storing means;

controlling means for selectively providing the microprogram word read from said first storing means or said second storing means to said first microprogram word holding means; and branching determining means, when said microprogram word held in said first microprogram word holding means is a conditional branching instruction, for executing branching determination processing of said conditional branching instruction;

said first storing means and said second storing means each including a plurality of banks, said addresses stored in said first and second address holding means each including a bank address for simultaneously accessing all the banks of said first storing means and said second storing means and a selection address for selecting one of said accessed banks; and said branching determining means, when said microprogram word held in said first microprogram holding means is a conditional branching instruction, outputting a branching determination signal for selecting a next microprogram word to be read from said first storing means and said second storing means from one of said accessed banks.

In this case, the microprogram controller may further comprise first selecting means for selectively holding said microprogram words read from all the banks of said first storing means, on a bank basis; and second selecting means for selectively holding said microprogram words read from all the banks of said second storing means, on a bank basis; and wherein said branching determining means selects a next microprogram word from one of said accessed banks by outputting said branching determination signal to said first selecting means or said second selecting means.

In the above-mentioned construction, said controlling means selects a microprogram word read from said first storing means or said second storing means as said microprogram word to be provided to said first microprogram word holding means, based on a command included in said microprogram word provided to said first microprogram word holding means.

In this case, the microprogram controller may further comprise third selecting means for selecting a microprogram word read from said first storing means or said second storing means and inputting the same to said first microprogram word holding means, and wherein said controlling means selects said microprogram word to be provided to said first microprogram word holding means by switching said selecting means according to a command included in said microprogram word provided to said first microprogram word holding means.

In the above-mentioned construction, the microprogram controller may further comprise second microprogram word holding means connected to said first microprogram word holding means for temporarily storing said microprogram word read from said second storing means, and branching determination synchronizing means, when a microprogram word held in said second microprogram word holding means is a conditional branching instruction, for holding said microprogram word from being read from said first storing means and said second storing means in synchronization with the conditional branching processing performed by said branching determining means according to said conditional branching instruction.

These and other objects, features and advantages of the present invention will become more apparent from the following detailed description of the present invention.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

FIG. 2 is a timing chart illustrating operation of the microprogram controller shown in FIG. 1.

FIG. 3 is a diagram showing an example of a coding chart of the microprogram sequence control performed in the microprogram controller shown in FIG. 1.

FIG. 4 is a diagram showing a field arrangement of a microprogram instruction word.

FIG. 5 is a diagram showing examples of the contents of sequence control commands to be written in the "ISQ" field of the microprogram instruction word shown in FIG. 4.

FIG. 6 is a diagram showing examples of the contents of hardware control commands to be written in the "FUT" field of the microprogram instruction word shown in FIG. 4.

FIG. 7 is a diagram showing the contents of the table of conditional branching determination control in branching determination processing performed by a branching determination circuit.

DESCRIPTION OF THE PREFERRED EMBODIMENT

Figure 1:
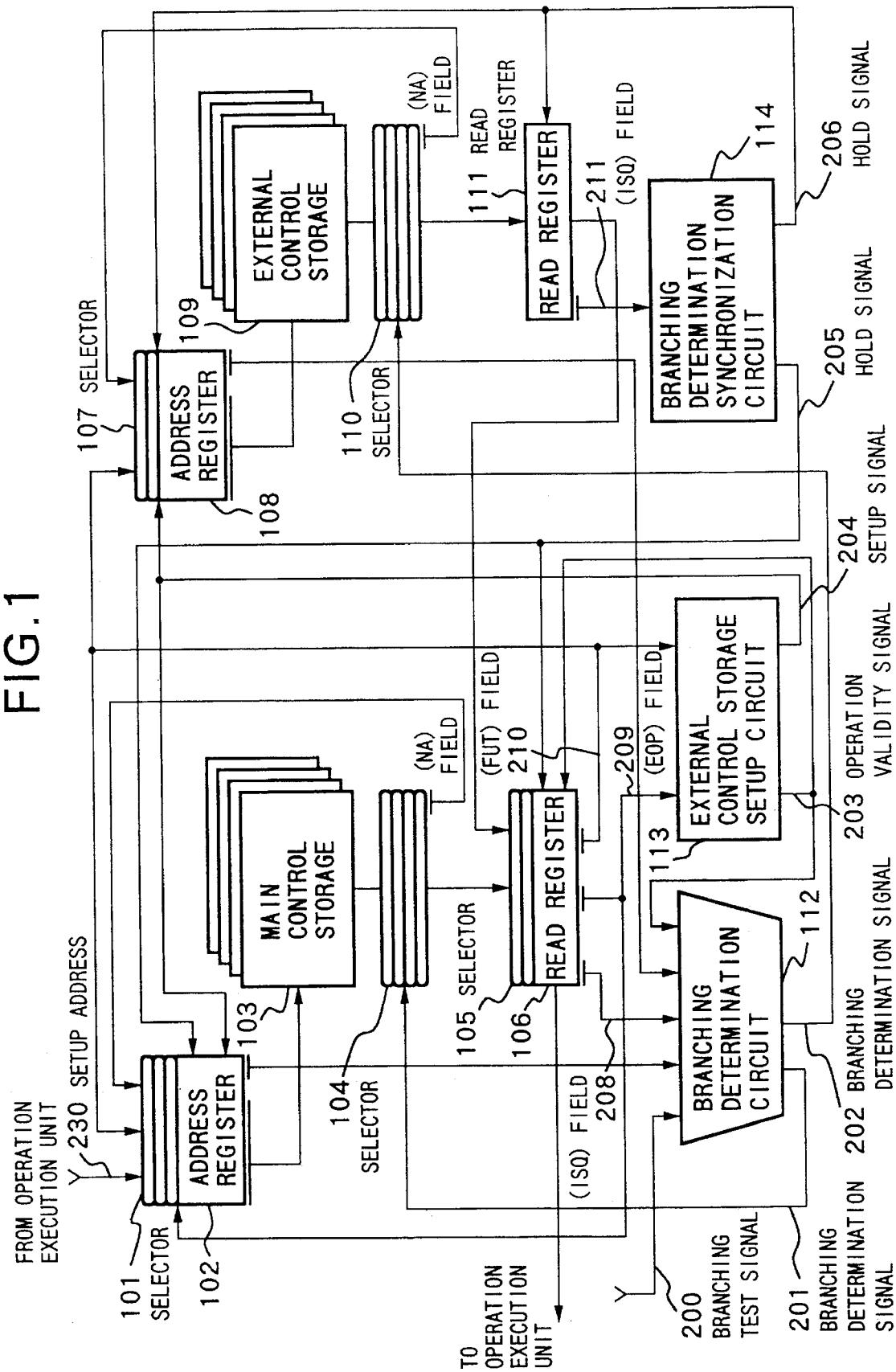
FIG. 1 is a block diagram showing an arrangement of a microprogram controller according to a preferred embodiment of the present invention.

FIG. 1 is a block diagram showing a system arrangement of a microprogram controller according to a preferred embodiment of the present invention. In FIG. 1, the microprogram controller of the present embodiment comprise a main control storage 103, which is a first storage for storing a microprogram, and an external control storage 109, which is a second storage for storing a microprogram.

The external control storage 109 holds a microprogram, when the microprogram is too large in size to be held singly by the main control storage 103. The external control storage 109, may be for example, a storage whose access time is longer and whose manufacturing costs are lower than those of the main control storage 103. In addition, the external control storage 109 is made up into a chip separate from that of the main control storage 103.

Connected to the main control storage 103 are a selector 101, an address register 102, selectors 104 and 105 and a read register 106. Connected to the external control storage 109 are a selector 107, an address register 108, a selector 110 and a read register 111. Further provided are a branching determination circuit 112, an external control storage setup circuit 113 and a branching determination synchronization circuit 114 for controlling reading of instruction words of a microprogram from the two control storages 103 and 109.

The selector 101 selects an address to be provided to the address register 102. Input to the selector 101 are a setup address 203 for initially setting up a microprogram sent from an operation execution unit, a value of the "NA" field of a microprogram instruction word, and a value of the "FUT" field, of the microprogram instruction word held in the read register 106.

The selector 107 selects an address to be provided to the register 108. Input to the selector 107 are a value of the "NA" field of a microprogram instruction word and a value of the "FUT" field of a microprogram instruction word held in the read register 106.

The main control storage 103 and the external control storage 109 each have a capacity of 4 KW (1 KW×4 banks). In accessing the main control storage 103 and the external control storage 109, four banks of each of the storages 103 and 109 are simultaneously read by the most significant 10 bits of each of the address registers 102 and 108, respectively. Then, one of the read four banks of each of the storages 103 and 109 is selected by branching determination signals 201 and 202 to execute multi-directional, that is, bi-directional or four-directional, condition branching instructions. Coding of the microprogram is equally possible for each of the control storages 103 and 109.

As illustrated in FIG. 4, each microprogram instruction word to be read from the control storages 103 and 109 is comprised of fields of "ISQ", "EOP", "FUT", "NA", etc.

The "ISQ (Instruction Sequence)" field controls a microprogram sequence indicated by each of such commands as "BRS (unconditional branching instruction command)", "CBR2 (bi-directional condition branching instruction command)", "CBR4 (four-directional condition branching instruction command)". A bit pattern and an operation outline of each command are shown in FIG. 5.

"BRS (unconditional branching instruction command)" is to use the value of the "NA (Next Address)" field of a microprogram instruction word read from the control storages 103 and 109, as an address of a next instruction word to be read and executed.

"CBR2 (bi-directional condition branching instruction command)" is to use, as an address of a next instruction word to be read and executed, the value of the "NA" field of a microprogram instruction word selected by the 2-bit branching determination signal 201 or 202 which is made up of one lower-order bit of the address register 102 or 108 used as its higher-order bit and one lower-order bit of a branching test signal 200 used as its lower-order bit.

"CBR4 (four-directional condition branching instruction command)" is to use, as an address of a next instruction word to be read and executed, the value of the "NA" field of the microprogram instruction word selected by the 2-bit branching determination signal 201 or 202 obtained by substituting the branching test signal 200 for two lower-order bits of the address register 102 or 108, respectively.

The "EOP (End of Operation)" field is a command to direct the end of the microprogram sequence. Execution of the command directs the address register 102 or 108 to provide an address for reading a successive microprogram instruction word, and controlling the external control storage setup circuit 113.

The "FUT (Function Unit)" field is comprised of commands for controlling hardware. A bit pattern and an operation outline of each command to be written in the "FUT (Function Unit)" field are shown in FIG. 6.

Illustrated herein is the "START" command as an example of commands of the "FUT (Function Unit)" field. The "START" command is to control readout from the main control storage 103 or the external control storage 109 during the execution of the microprogram sequence control. In the present embodiment, the "FUT" field is made up of 13 bits. The most significant (0th) bit (with the logical value "1") is for the discrimination between the "START" command and other commands, and the remaining 1st to 12th bits (hereinafter, referred to as FUT (1:12)) are used as addresses to be provided to the address register 102 or 108 and used for the setup of the external control storage setup circuit 113.

The logical value "0" of the most significant (0th) bit of the "FUT" field indicates control commands other than the "START" command. The other commands include a command for directing register set, a command for the execution of operations and a command for the selecting operation by the selectors.

The address register 102 holds addresses of the main control storage 103, while the address register 108 holds addresses of the external control storage 109. Each register is made up of 12 bits (from the most significant 0th bit to the least significant 11th bit). More significant ten bits are used as the addresses to simultaneously access the four banks of the main control storage 103 or the external control storage 109 to read microprogram instruction words, while the remaining two least significant bits are used for selecting one of the four microprogram instruction words read from the four banks.

The read register 106 is a register for holding microprogram words read from the main control storage 103 and microprogram instruction words read from the external control storage 109 and sent through the read register 111. With any instruction word read from the main control storage 103 and the external control storage 109, the microprogram is executed by the output of the read register 106. More specifically, the microprogram instruction words held in the read register 106 are loaded into the operation execution unit for execution.

Direction as to the setting of the microprogram instruction words are given by an operation validity signal 203 output from the external control storage setup circuit 113. With the operation validity signal 203 having the logical value "0" or "1", the microprogram instruction words of the main control storage 103 or the external control storage 109 are respectively provided through the selector 105.

The read register 111 is a register for holding microprogram instruction words read from the external control storage 109.

The branching determination circuit 112 is for making conditional branching determination for the microprogram. Input to the branching determination circuit 112 are an "ISQ" field 208 of a microprogram instruction word held in the read register 106, the branching test signal 200, the least significant two bits (10th and 11th) of the address register 102 or the least significant two bits (10th and 11th bits) of the address register 108, and the operation validity signal 203 from the external control storage setup circuit 113.

Then, based on the received "ISQ" field 208, branching test signal 200, least significant two bits of the address register 102 or 108, and operation validity signal 203, the branching determination circuit 112 makes such conditional branching determination as shown in FIG. 7 to output the branching determination signal 201 or 202 as a result.

The branching test signal 200 is a signal sent as a 2-bit branching determination condition signal to the branching determination circuit 112 by selecting, based on the microprogram instruction words, branching condition flags (operation result etc.) held in the operation execution unit which loads and executes the microprogram instruction words stored in the read register 106.

In the conditional branching determination, when the operation validity signal 203 is in state "0" and the "ISQ" field 208 indicates "BRS", the least significant two bits (10th and 11th bits) of an address stored in the address register 102 are output as the branching condition determination signal 201. When the operation validity signal 203 is in state "0" and the "ISQ" field 208 indicates "CBR2", the 2-bit branching determination signal 201 is output using, as its higher-order bit, the least significant bit (11th bit) of the address stored in the address register 102 and, as its lower-order bit, a lower-order bit of the branching test signal 200. When the operation validity signal 203 is logical "0" and the "ISQ"field 208 indicates "CBR4", the two bits of the branching test signal 200 are output as the branching condition determination signal 201.

When the operation validity signal 203 is in state "1" and the "ISQ"field 211 indicates "BRS", the least significant two bits (10th and 11th) of the address stored in the address register 102 are output as the branching condition determination signal 202. When the operation validity signal 203 is in state "1" and the "ISQ" field 211 indicates "CBR2", the 2-bit branching determination signal 202 is output using, as its higher-order bit, the least significant bit (11th bit) of the address stored in the address register 102 and, as its lower-order bit, a lower-order bit of the branching test signal 200. When the operation validity signal 203 is logical "1" and the "ISQ" field 211 indicates "CBR4", the two bits of the branching test signal 200 are output as the branching condition determination signal 202.

Then, the selector 104 of the main control storage 103 is controlled by the branching determination signal 201 to select the microprogram instruction words read from the four banks of the main control storage 103. The selector 110 of the external control storage 109 is controlled by the branching determination signal 202 to select the microprogram instruction words read from the four banks of the external control storage 109.

The external control storage setup circuit 113 is a circuit for controlling the start of reading from the main control storage 103 and the external control storage 109. The external control storage setup circuit 113 receives an input of the "START" command indicated in the "FUT" field 210 of an instruction word of the read register 106 to turn on a setup signal 204 and the operation validity signal 203 (set to logic "1"). The circuit 113 resets the operation validity signal 203 (set to logic "0") by receiving the input of the "EOP" field 209.

The external control storage setup circuit 113 turns on the setup signal 204 simultaneously with the input of the "START" command of the "FUT" field 210 of the read register 106, and turns on the operation validity signal 203 after two cycles from a rise of the setup signal 204.

As described above, the operation validity signal 203 gives directions as to the providing of the microprogram instruction words to the read register 106 and controls branching determination to be performed by the branching determination circuit 112. The setup signal 204 controls the setting of the "FUT" (1:12) field to the address registers 102 and 108. More specifically, when the setup signal 204 is in OFF state (with logic "0"), the "FUT" (1:12) field is provided to the address register 102, and when it is in ON state (with logic "1"), the "FUT" (1:12) field is provided to the address register 108.

The branching determination synchronization circuit 114 is for controlling synchronization between the control storages and execution of conditional branching instructions when the microprogram instruction words read from the external control storage 109 indicate conditional branching instructions (when the "ISQ" field indicates the "CBR2" or "CBR4" command) in order to execute the instructions after the transfer of the instruction words from the read register 111 to the read register 106. In other words, during the branching determination processing, the branching determination synchronization circuit 114 holds microprogram instruction words from being read from the main control storage 103 or the external control storage 109 in order to prevent readout of the microprogram instruction words in the course of the processing.

The branching determination synchronization circuit 114 receives the input of the "ISQ" field 211 from the read register 111 and outputs a hold signal 205 or 206. The hold signal 205 controls holding operation of the main control storage 103, while the hold signal 206 controls holding operation and conditional branching instructions of the external control storage 109. The branching determination synchronization circuit 114 outputs the hold signal 206 simultaneously with the input of the "ISQ" field 211 from the read register 111, and outputs the hold signal 205 after one cycle from a rise of the hold signal 206.

With reference to FIGS. 2 and 3, description will be given of the operation of the microprogram controller structured as described above.

Illustrated in the timing chart of FIG. 2 are operations of the microprogram sequence control of instructions, which operations include two steps A0 and A1 to be executed by the main control storage 103, four steps B0 to B3 and another four steps B4 to B7 to be executed by the external control storage 109 as shown in the coding chart of FIG. 3.

In FIG. 2, alphanumeric characters in the parentheses written in the address registers 102 and 108 indicate addresses, while alphanumeric characters written in the read registers 106 and 111 indicate instruction words read by the addresses with the corresponding alphanumeric characters.

At timing T0, the address (A0) of the microprogram instruction word of Step A0, composed of the "BRS" command, the "START" (B0) command, and the NA field (A1), is held in the address register 102. Herein, "B0" of the "START" (B0) command indicates the above-described FUT (1:12). At timing T1, the microprogram instruction word A0 of Step A0 is read from the main control storage 103 by the address (A0) of the address register 102 and provided to the read register 106. At the same timing, the address (A1) is provided to the address register 102 according to the value of the NA field (A1) of Step A0. The main control storage 103 continues following the loop sequence of Step A1 until the "EOP" field is issued.

At timing T1, the setup signal 204 is output from the external control storage setup circuit 113 in response to the "START" (B0) command output from the read register 106. At timing T2, the "FUT" (1:12) field is provided to the address register 108 (Step B0) as the address (B0). After two cycles from timing T1, at timing T3, the operation validity signal 203 is output from the external control storage setup circuit 113. Output of the signal 203 continues until the processing by the external control storage 109 terminates (until the "EOP" field is output at timing T10).

At timing T3, the microprogram instruction word B0 is provided to the read register 111, and the address (B1) is provided to the address register 108 according to the NA field (B1) of Step B0.

At timing T4, the microprogram instruction word B1 is provided to the read register 111, the address (B2) is provided to the address register 108 according to the NA field (B2) of Step B1, and the microprogram word B0 is transferred from the read register 111 to the read register 106.

Also in Step B1, with the output of the "CBR2" command of the ISQ field from the read register 111, the hold signal 206 is output from the branching determination synchronization circuit 114 at timing T4–T5, and the hold signal 205 is output one cycle later, at timing T5–T6.

At timing T5, the microprogram instruction word B1 of Step B1 is transferred to the read register 106 because of non-output of the hold signal 205 at timing T4.

At this timing, the branching determination circuit 112 executes branching determination based on the "CBR2" command of Step B1, which is the output of the read register 106, the lower-order two bits of the address of Step B1, which is the output of the address register 108, the operation validity signal 203 and the branching test signal 200. As a result, the branching determination signal 202 is output at timing T6 based on the conditional branching determination shown in FIG. 7.

As to the four microprogram instruction words accessed by higher-order 10 bits of the address (B2) of the address register 108 and read from the four banks of the external control storage 109, one of the four is selected by controlling the selector 110 in response to the branching determination signal 202, and the microprogram instruction word B4 of Step B4 is provided to the read register 111 at timing T7. Then, the address (B5) of the instruction word of Step B5 is provided to the address register 108 according to the "NA" field (B5) of the instruction word B4.

Thereafter, at timing T7–10, the sequence control of Steps B5 to B7 is executed in the external control storage 109. At timing T7–T11, reading of the microprogram words in Steps B4 to B7 is executed by the read register 106.

At timing T10, the "EOP" field indicative of the end of the instructions is output from the the microprogram instruction word B6 of Step B6 held in the read register 106. At timing T11, upon the input of the "EOP" field to the external control storage setup circuit 113, the operation validity signal 203 is reset to control the setting of the address (C1) of the first step of the following C instructions to the address register 102. Also at timing T11, the execution of Step B7 output from the read register 106 terminates the microprogram control according to the A instructions.

In the above-described execution of the microprogram held in the external control storage 109, which microprogram is too large in size to be held in the main control storage 103, setup of the external control storage 109 at timing T1–T3 and conditional branching instruction processing at timing T5–T6 make it possible to perform microprogram control with a minimum delay as compared with the control of the microprogram read from the main control storage 103.

As described in the foregoing, the microprogram controller according to the present invention can achieve high-speed processing of a large-sized microprogram which can not be held by a single control storage by transferring an output from a read register of an external control storage to a read register of a main control storage, and providing a branching determination circuit for making branching determination of conditional branching instructions from the main control storage and the external control storage and a branching determination synchronization circuit for executing conditional branching instructions and controlling synchronization between the main control storage and the external control storage when the conditional branching instructions come from the external control storage.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A microprogram controller comprising:

first storing means for storing a microprogram;

second storing means for storing said microprogram;

first address holding means for holding an address for reading a first microprogram word from said first storing means;

second address holding means for holding an address for reading a second microprogram word from said second storing means;

first microprogram word holding means for holding one of said first microprogram word read for execution from said first storing means and said second microprogram word read for execution from said second storing means; and controlling means for selectively providing one of the first microprogram word read from said first storing means and the second microprogram word read from said second storing means to said first microprogram word holding means, wherein said controlling means selects one of said first microprogram word read from said first storing means and said second microprogram word read from said second storing means as a next microprogram word to be provided to said first microprogram word holding means based on a command included in a current microprogram word held by said first microprogram word holding means.

2. A microprogram controller as set forth in claim 1, further comprising selecting means for selecting one of said first microprogram word read from said first storing means and said second microprogram word read from said second storing means and for inputting the selected microprogram word to said first microprogram word holding means, wherein said controlling means selects said selected microprogram word to be provided to said first microprogram word holding means by switching said selecting means based on a command included in said current microprogram word held by said first microprogram word holding means.

3. A microprogram controller as set forth in claim 1, further comprising second microprogram word holding means for temporarily storing said second microprogram word read from said second storing means, said second microprogram word holding means being connected to said first microprogram word holding means.

4. A microprogram controller comprising:

first storing means for storing a microprogram;

second storing means for storing said microprogram;

first address holding means for holding an address for reading a first microprogram word from said first storing means;

second address holding means for holding an address for reading a second microprogram word from said second storing means;

first microprogram word holding means for holding one of said first microprogram word read for execution from said first storing means and said second microprogram word read for execution from said second storing means;

controlling means for selectively providing one of said first microprogram word read from said first storing means and said second microprogram word read from said second storing means to said first microprogram word holding means; and branching determining means, wherein, when a current microprogram word held in said first microprogram word holding means includes a conditional branching instruction, said branching determining means executes branching determination processing of said conditional branching instruction, wherein said controlling means selects one of said first microprogram word read from said first storing means and said second microprogram word read from said second storing means as a next microprogram word to be provided to said first microprogram word holding means, based on a command included in said current microprogram word held in said first microprogram word holding means.

5. A microprogram controller as set forth in claim 4, further comprising selecting means for selecting one of said first microprogram word read from said first storing means and said second microprogram word read from said second storing means and for inputting the selected microprogram word to said first microprogram word holding means, wherein said controlling means selects said selected microprogram word to be provided to said first microprogram word holding means by switching said selecting means based on a command included in said current microprogram word held by said first microprogram word holding means.

6. A microprogram controller as set forth in claim 4, further comprising second microprogram word holding means for temporarily storing said second microprogram word read from said second storing means, said second microprogram word holding means being connected to said first microprogram word holding means.

7. A microprogram controller as set forth in claim 4, further comprising branching determination synchronizing means, wherein, when said conditional branching instruction is read from said second storing means, said branching determination synchronizing means holds one of said first microprogram word from being read from said first storing means and said second microprogram word from being read from said second storing means in synchronization with the conditional branching processing performed by said branching determining means according to said conditional branching instruction.

8. A microprogram controller as set forth in claim 4, further comprising:

second microprogram word holding means connected to said first microprogram word holding means for temporarily storing said second microprogram word read from said second storing means; and branching determination synchronizing means, wherein, when said second microprogram word held in said second microprogram word holding means includes a conditional branching instruction, said branching determination synchronizing means holds one of said first microprogram word from being read from said first storing means and said second microprogram word from being read from said second storing means in synchronization with the conditional branching processing performed by said branching determining means according to said conditional branching instruction.

9. A microprogram controller as set forth in claim 4, wherein:

said first storing means and said second storing means each include a plurality of banks, and said addresses held in said first and second address holding means each include a bank address for simultaneously accessing all the banks of said first storing means and said second storing means and a selection address for selecting one of said accessed banks.

10. A microprogram controller as set forth in claim 4, wherein:

said first storing means and said second storing means each include a plurality of banks, said addresses held in said first and second address holding means each include a bank address for simultaneously accessing all the banks of said first storing means and said second storing means and a selection address for selecting one of said accessed banks, and said branching determining means, when said current microprogram word held in said first microprogram word holding means includes said conditional branching instruction, outputs a branching determination signal for selecting a next microprogram word to be read from one of said first storing means and said second storing means from one of said accessed banks, according to said conditional branching instruction.

11. A microprogram controller, comprising:

first storing means for storing a microprogram;

second storing means for storing said microprogram;

first address holding means for holding an address for reading a first microprogram word from said first storing means;

second address holding means for holding an address for reading a second microprogram word from said second storing means;

first microprogram word holding means for holding one of said first microprogram word read for execution from said first storing means and said second microprogram word read for execution from said second storing means;

controlling means for selectively providing one of the first microprogram word read from said first storing means and the second microprogram word read from said second storing means to said first microprogram word holding means; and branching determining means:

wherein, when a current microprogram word held in said first microprogram word holding means includes a conditional branching instruction, said branch determining means executes branching determination processing of said conditional branching instruction, and wherein said first storing means and said second storing means each include a plurality of banks, said addresses held in said first and second address holding means each include a bank address for simultaneously accessing all the banks of said first storing means and said second storing means and a selection address for selecting one of said accessed banks, and said branching determining means, when said current microprogram word held in said first microprogram holding means includes said conditional branching instruction, outputs a branching determination signal for selecting a next microprogram word to be read from one of said first storing means and said second storing means from one of said accessed banks.

12. A microprogram controller as set forth in claim 11, further comprising:

first selecting means for selectively holding microprogram words read from all the banks of said first storing means, on a bank basis; and second selecting means for selectively holding microprogram words read from all the banks of said second storing means, on a bank basis; and wherein said branching determining means selects said next microprogram word from one of said accessed banks by outputting said branching determination signal to one of said first selecting means and said second selecting means.

13. A microprogram controller as set forth in claim 11, wherein:

said controlling means selects one of said first microprogram word read from said first storing means and said second microprogram word read from said second storing means as said next microprogram word to be provided to said first microprogram word holding means based on a command included in said current microprogram word held by said first microprogram word holding means.

14. A microprogram controller as set forth in claim 13, further comprising third selecting means for selecting one of said first microprogram word read from said first storing means and said second microprogram word read from said second storing means and for inputting the selected microprogram word to said first microprogram word holding means, wherein said controlling means selects said selected microprogram word to be provided to said first microprogram word holding means by switching said selecting means according to a command included in said current microprogram word held by said first microprogram word holding means.

15. A microprogram controller as set forth in claim 11, further comprising second microprogram word holding means for temporarily storing said second microprogram word read from said second storing means, said second microprogram word holding means being connected to said first microprogram word holding means.

16. A microprogram controller as set forth in claim 11, further comprising branching determination synchronizing means, wherein, when said conditional branching instruction is read from said second storing means, said branching determination synchronizing means holds one of said first microprogram word from being read from said first storing means and said second microprogram word from being read from said second storing means in synchronization with the conditional branching processing performed by said branching determining means according to said conditional branching instruction.

17. A microprogram controller as set forth in claim 11, further comprising:

second microprogram word holding means connected to said first microprogram word holding means for temporarily storing said second microprogram word read from said second storing means, and branching determination synchronizing means, wherein, when said second microprogram word held in said second microprogram word holding means includes a conditional branching instruction, said branching determination synchronization means holds one of said first microprogram word from being read from said first storing means and said second microprogram word from being read from said second storing means in synchronization with the conditional branching processing performed by said branching determining means according to said conditional branching instruction.

* * * * *